US012809691B2

United States Patent

(12) United States Patent
Bhaskara et al.

(10) Patent No.: US 12,809,691 B2
(45) Date of Patent: Nov. 24, 2026

(54) HARDWARE-BASED CONTROL OF PROCESSOR CORE OPERATING FREQUENCY

(71) Applicant: QUALCOMM Incorporated, San Diego, CA (US)

(72) Inventors: Aravind Bhaskara, San Diego, CA (US); Murari Prabhakar Alawandi, Bengaluru (IN); Swapnesh Kumar Sahoo, Bengaluru (IN); Tauseef Kazi, San Diego, CA (US); Nitin Bandwar, San Diego, CA (US); Mei Yang, San Diego, CA (US); Pavan Kumar Chilamkurthi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 217 days.

(21) Appl. No.: 18/620,202

(22) Filed: Mar. 28, 2024

(65) Prior Publication Data

US 2025/0307031 A1 Oct. 2, 2025

(51) Int. Cl.
*G06F 9/50* (2006.01)

(52) U.S. Cl.
CPC .................................. *G06F 9/5094* (2013.01)

(58) Field of Classification Search
CPC ..................................................... G06F 9/5094
See application file for complete search history.

(56) References Cited

U.S. PATENT DOCUMENTS

2008/0201591 A1* 8/2008 Hu ........................ G06F 1/3203 713/323
2011/0239006 A1* 9/2011 Hsu ....................... G06F 1/3296 713/300
2014/0049327 A1* 2/2014 Bruset ...................... H03B 5/32 331/44
2018/0301119 A1* 10/2018 Koker ................... G06F 1/3234
2019/0089363 A1* 3/2019 Miro Panades ....... G06F 1/3296
2022/0247314 A1* 8/2022 Zou .......................... H02J 1/14

FOREIGN PATENT DOCUMENTS

WO WO-2014017472 A1 * 1/2014 ........... H03K 23/667

* cited by examiner

*Primary Examiner* — Andrew J Jung
(74) *Attorney, Agent, or Firm* — MOORE IP

(57) ABSTRACT

A device includes a processor core and a frequency control circuit. The frequency control circuit is configured to obtain a signal based on a target frequency for the processor core. The frequency control circuit is also configured, based on the signal, to cause an operating frequency of the processor core to cycle between a first frequency greater than the target frequency and a second frequency less than the target frequency.

20 Claims, 6 Drawing Sheets

HARDWARE-BASED CONTROL OF PROCESSOR CORE OPERATING FREQUENCY

I. FIELD

The present disclosure is generally related to hardware-based control of processor core operating frequency.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices can include multiple processor cores that can be used to support particular functionality, such as image processing pipelines and other complex functionality. To reduce voltage and power consumption, some computing devices implement dynamic clock voltage scaling (DCVS) with multiple different levels (e.g., voltage and frequency steps). For example, a processor core may be operated at a lower operating frequency, which uses less voltage and thus consumes less power, during time periods when core performance requirements are lessened. However, to reduce complexity, most devices support only a limited number of DCVS levels, such that a processor core is operated at a frequency associated with a DCVS level having a voltage level that satisfies a voltage criterion. Depending on the spacing between the frequencies and the voltage levels associated with the supported DCVS levels, operating the processor core at the frequency of the DCVS level can result in a voltage level that is higher than needed to satisfy the performance criterion, thus resulting in inefficient power consumption.

III. SUMMARY

According to one implementation of the present disclosure, a device includes a processor core and a frequency control circuit. The frequency control circuit is configured to obtain a signal based on a target frequency for the processor core. The frequency control circuit is also configured, based on the signal, to cause an operating frequency of the processor core to cycle between a first frequency greater than the target frequency and a second frequency less than the target frequency.

According to one implementation of the present disclosure, a method includes obtaining a signal based on a target frequency for a processor core. The method also includes, based on the signal, causing an operating frequency of the processor core to cycle between a first frequency greater than the target frequency and a second frequency less than the target frequency.

According to one implementation of the present disclosure, a non-transitory computer-readable medium stores instructions that, when executed by at least one processor, cause the at least one processor to obtain a signal based on a target frequency for a processor core. The instructions also cause the at least one processor, based on the signal, to cause an operating frequency of the processor core to cycle between a first frequency greater than the target frequency and a second frequency less than the target frequency.

According to one implementation of the present disclosure, an apparatus includes means for obtaining a signal based on a target frequency for a processor core. The apparatus also includes means for causing, based on the signal, an operating frequency of the processor core to cycle between a first frequency greater than the target frequency and a second frequency less than the target frequency.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
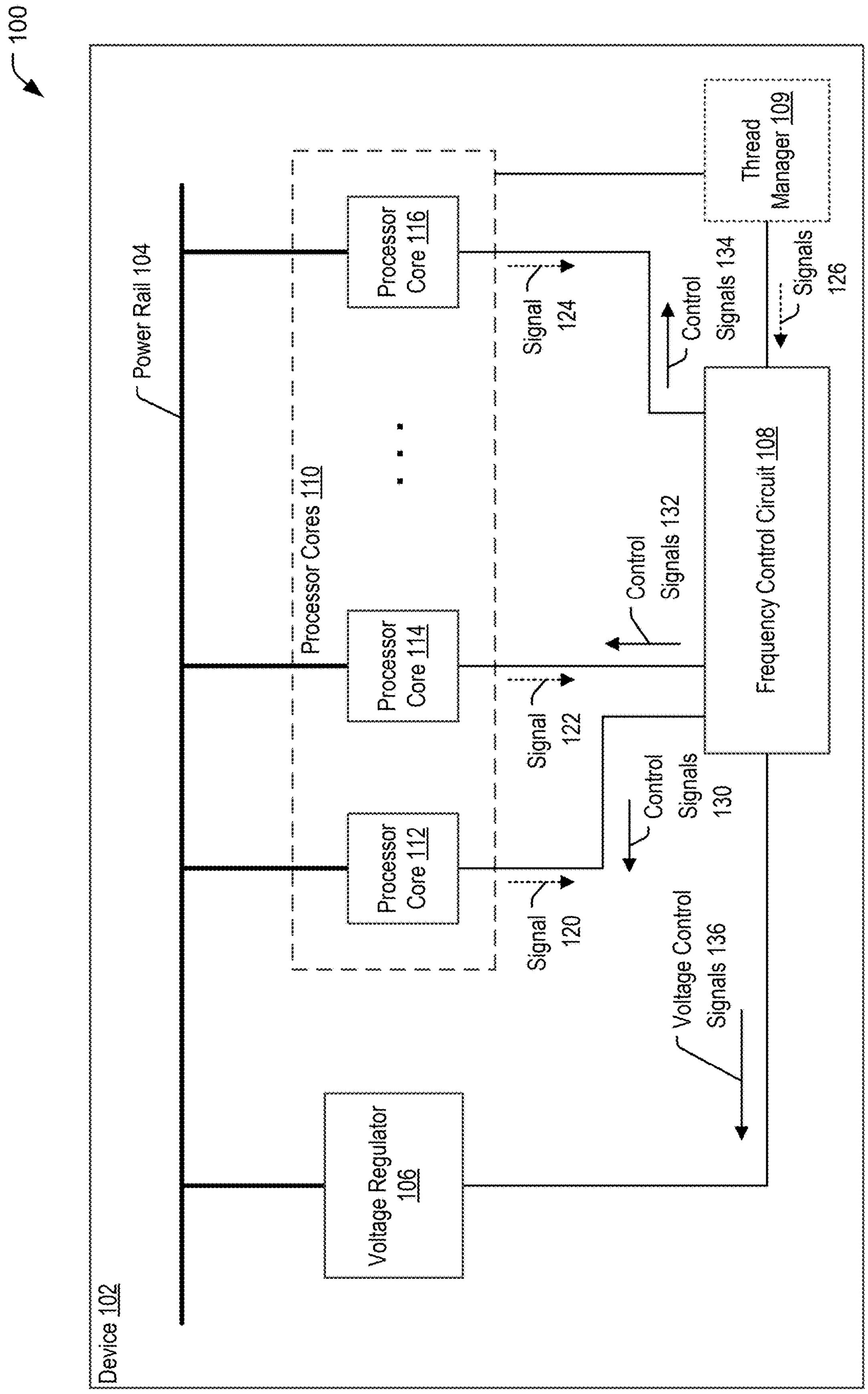
FIG. 1 is a block diagram of a particular illustrative aspect of a system operable to perform hardware-based control of processor core operating frequency, in accordance with some examples of the present disclosure.

Some computing devices implement dynamic clock voltage scaling (DCVS) to enable processing cores to be operated at different frequencies during different time periods in order to reduce power consumption when core performance requirements are lessened. For example, a processor core may be capable of being operated at one of multiple different operating frequencies, each associated with a corresponding voltage. During time periods associated with less stringent core performance requirements, the processor core may be operated at a lower frequency and voltage step than during other time periods associated with more stringent core performance requirements, which enables a reduction in voltage, and thus power consumption, during the time periods. However, to reduce complexity, most devices support only a limited number of DCVS levels, such that a processor core is operated at a frequency associated with a DCVS level having a voltage level that satisfies a voltage criterion. Depending on the spacing between the frequencies and the voltage levels associated with the supported DCVS levels, operating the processor core at the frequency of the DCVS level can result in a voltage level that is higher than needed to satisfy the performance criterion, thus resulting in inefficient power consumption.

Systems and methods of hardware-based control of processor core operating frequency are disclosed. At least some of the aspects disclosed herein describe a frequency control circuit that is configured to obtain a signal based on a target frequency of a processor core and to control an operating frequency of the processor core based on the signal. For example, the frequency control circuit may be configured to cause the operating frequency of the processor core to cycle between a first frequency that is greater than the target frequency and a second frequency that is less than the target frequency. In some implementations, the frequencies and duration of the cycling is selected such that an average operating frequency of the processor core is based on the target frequency. In some examples, a device that includes the processor core may support multiple dynamic clock voltage scaling (DCVS) levels, each of which is associated with a corresponding frequency and a corresponding voltage level, and the supported DCVS levels may include a first DCVS level associated with a first frequency that is greater than the target frequency and a second DCVS level associated with a second frequency that is less than the target frequency. In such examples, the frequency control circuit may cause the operating frequency of the processor core to be set at the first frequency for a first time period and to be set at the second frequency for a second time period. These first and second time periods may be selected such that the average operating frequency of the processor core during a time interval (e.g., a combined duration of the first time period and the second time period) is based on the target frequency. As an illustrative, non-limiting example, if the first frequency is 500 megahertz (MHz), the second frequency is 400 MHZ, and the target frequency is 430 MHz, the frequency control circuit may cause the operating frequency of the processor core to be set at 500 MHz for a first time period having a first duration (e.g., 3 milliseconds (ms)) and at 400 MHz for a second time period having a second duration (e.g., 7 ms), with the first duration and the second duration are selected such that the average operating frequency over both time periods is 430 MHz.

In some implementations, the frequency control circuit is configured to control operating frequencies of multiple processor cores in a temporally-aligned manner. In some such implementations, the frequency control circuit may temporally align transitions of operational frequencies of a common type (e.g., from relatively lower frequency to relatively higher frequency, or from relatively higher frequency to relatively lower frequency) across the multiple processor cores, such that time periods during which the operating frequencies of the multiple processing cores are relatively higher overlap in time with each other. For example, the frequency control circuit may temporally align a first transition of an operating frequency of a first processing core from a respective higher frequency to a respective lower frequency with a second transition of an operating frequency of a second processing core from a respective higher frequency to a respective lower frequency. Such temporal alignment of transitions may cause time periods during which the multiple processor cores are operated at relatively higher frequencies, and thus time period when a shared power rail of the multiple processor cores is set at a higher voltage level, to overlap in time.

At least some aspects of the present disclosure provide systems and methods that support hardware-based control of processor core operating frequency in a manner that reduces power consumption as compared to other systems that employ DCVS levels. For example, by cycling the operating frequency of a processor core between the two frequencies associated with the nearest supported DCVS levels, the processor core may be operated closer to the target frequency as compared to operating the processor core at either of the frequencies associated with the nearest supported DCVS levels. A technical effect of cycling the operating frequency between the two frequencies is to reduce power consumption as compared to setting the operating frequency at the frequency associated with the higher of the nearest supported DCVS levels, without experiencing the performance degradation associated with setting the operating frequency at the frequency associated with the lower of the nearest supported DCVS levels. Additionally, at least some aspects of the present disclosure support operational frequency control for multiple processor cores that temporally aligns the transitions between frequencies in a common direction across the multiple processor cores. A technical effect of this temporal alignment of transitions is to reduce the amount of time the shared power rail operates at the higher voltage as compared to cycling the operating frequency of each processor core individually, which may reduce the overall power consumption of the system.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a frequency control circuit 108 that receives one or more signals ("signal(s)" 126 of FIG. 1), which indicates that in some implementations, the frequency control circuit 108 receives a single signal 126 and in other implementations the frequency control circuit 108 receives multiple signals 126. For ease of reference herein, such features are generally introduced as "one or more" features and are subsequently referred to in the singular or optional plural (as indicated by "(s)") unless aspects related to multiple of the features are being described. Additionally, or alternatively, some components described herein are optional, such that in some implementations the components are included and in other implementations the components are omitted. To illustrate, FIG. 1 depicts an optional thread manager 109, which indicates that in some implementations, the thread manager 109 is included in a device 102, and in other implementations the thread manager 109 is omitted from the device 102. For ease of reference, such optional components are generally introduced as "optional" components and are typically illustrated in the accompanying figures using dotted lines.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system operable to perform hardware-based control of processor core operating frequency is disclosed and generally designated 100. The system 100 includes a device 102 that includes a plurality of components that are configured to perform operations to enable functionality described herein, to support hardware-based control of processor core operating frequency, or a combination thereof.

In a particular implementation, the device 102 includes a power rail 104, a voltage regulator 106, a frequency control circuit 108, an optional thread manager 109, and multiple processor cores 110. It should be understood that the device 102 may include additional components, such as a transmitter, a receiver, a camera or other image capture device, other components, fewer components, or a combination thereof, to support the functionality described herein. The power rail 104 is coupled to the voltage regulator 106 and the multiple processor cores 110 and is configured to provide power to the multiple processor cores 110. Because the power rail 104 provides power to multiple cores, the power rail 104 may be referred to as a "shared power rail". The voltage regulator 106 is coupled to the power rail 104 and the frequency control circuit 108 and is configured to control a voltage of the power rail 104. For example, the voltage regulator 106 may output an output voltage to the power rail 104 to maintain the voltage of the power rail 104 at the output voltage. In some implementations, the voltage regulator 106 is configured to set the output voltage based on signaling from the frequency control circuit 108, such as signaling based on operating frequencies of one or more of the multiple processor cores 110, as further described herein.

The multiple processor cores 110 are coupled to the power rail 104 and the frequency control circuit 108 and are configured to support performance of implementation-specific functionality. Each of the multiple processor cores 110 may include one or more microcontrollers, application specific integrated circuits (ASICs), field programmable gate arrays (FPGAs), central processing units (CPUs) having one or more processing cores, processing systems, or other circuitry and logic configured to facilitate the operations of the multiple processor cores 110. Although shown as multiple processor cores in the example of FIG. 1, in other implementations, the device 102 can include a single processor core. Control and management of operations performed by the multiple processor cores 110 may be performed by the thread manager 109 that is coupled to the frequency control circuit 108 and the multiple processor cores 110.

In the example shown in FIG. 1, the multiple processor cores 110 include a first processor core 112, a second processor core 114, and an nth processor core 116. In other implementations, the multiple processor cores 110 include fewer than three or more than three processor cores (e.g., n is less than three or more than three). In some implementations, the multiple processor cores 110 may be configured to operate as part of an image processing pipeline (e.g., a multi-core image processing pipeline) for image or video processing. For example, the first processor core 112 may be designated to perform operations associated with a first stage of an image processing pipeline, the second processor core 114 may be designated to perform operations associated with a second stage of the image processing pipeline, and the nth processor core 116 may be designated to perform operations associated with a last stage (e.g., an nth stage) of the image processing pipeline. Such an image processing pipeline may support functionality of one or more image processing applications or video processing applications. In other implementations, the multiple processor cores 110 may have a multi-threaded configuration or another type of processing system configuration, the multiple processor cores 110 may be configured to perform other operations, or a combination thereof. As non-limiting examples, such other operations may support audio processing, digital signal processing, virtual reality functionality, automated driving functionality, or other processing-intensive functionality.

The frequency control circuit 108 is coupled to the voltage regulator 106, the thread manager 109 (e.g., in implementations that include the thread manager 109), and the multiple processor cores 110. In examples, the frequency control circuit 108 is configured to control operating frequencies of one or more of the multiple processor cores 110, as further described herein. In some implementations, the multiple processor cores 110 are configured to support multiple dynamic clock voltage scaling (DCVS) levels, and the frequency control circuit 108 is configured to control the operating frequencies based on frequencies associated with the multiple DCVS levels. To illustrate, each of the multiple DCVS levels may include a frequency and a corresponding voltage used by a processor core that operates at the respective frequency, and the frequency control circuit 108 may set an operating frequency of one or more of the multiple processor cores 110 at one or more of the frequencies associated with the supported DCVS levels during various time periods, as further described herein.

In some implementations, the device 102 corresponds to or is included in one of various types of devices. In an illustrative example, the power rail 104, the voltage regulator 106, the frequency control circuit 108, the thread manager 109, the multiple processor cores 110, or a combination thereof, are integrated in a headset device, a mobile phone, a tablet computer device, a wearable electronic device, a voice-controlled speaker system, a camera device, a virtual reality headset, a mixed reality headset, an augmented reality headset, an extended reality headset, a vehicle, a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a navigation device, a headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In some implementations, the device 102 includes memory (e.g., a non-transitory storage medium) that stores instructions, that are executable by one or more processors to implement the functionality described with reference to the frequency control circuit 108. In a particular implementation, the device 102 may be included in a system-in-package or system-on-chip device.

During operation of the system 100, the multiple processor cores 110 may perform various operations with various power or voltage criteria. The frequency control circuit 108 may cause one or more of the multiple processor cores 110 to operate at average operating frequencies that are associated with voltage levels that satisfy the power or voltage criteria of the respective processor core operations. In other processing systems that support multiple DCVS levels, a target operating frequency for a processor core that achieves a voltage criterion may be sufficiently far in frequency from the frequencies of the nearest two DCVS levels, such that operating the processor core at the frequency of the nearest higher DCVS level results in a higher operating voltage than needed to satisfy the criterion, causing inefficiently high power consumption. In contrast to such systems, the frequency control circuit 108 may control an operating frequency of a processor core such that an average operating frequency during a time period is based on a target frequency that is between frequencies of two consecutive DCVS levels, thus reducing power consumption of the device 102 for operations of the multiple processor cores 110 for a wider variety of use cases.

To illustrate, the first processor core 112 may be designated to perform operations that are associated with a voltage criterion having an associated target frequency that is between frequencies associated with consecutive DCVS levels supported by the first processor core 112. As a non-limiting example, the first processor core 112 may support a first DCVS level associated with a first frequency of 500 MHz and a second DCVS level associated with a second frequency of 400 MHZ, and operations of the first processor core 112 may be associated with a target frequency of 430 MHz to satisfy a voltage criterion. The frequency control circuit 108 may obtain the target frequency and cycle an operating frequency of the first processor core 112 between multiple frequencies (e.g., frequencies of multiple supported DCVS levels) during a time period such that the average operating frequency of the first processor core 112 during the time period is based on the target frequency of 430 MHz.

To illustrate, the frequency control circuit 108 may obtain a signal based on a first target frequency for the first processor core 112. The signal may indicate or otherwise be based on the first target frequency of the first processor core 112 that is associated with a voltage level that satisfies a performance criterion associated with operations performed by the first processor core 112 (e.g., an application executed by at least the first processor core 112). The first target frequency can be different than frequencies associated with DCVS levels supported by the first processor core 112, as described above, such that the target frequency is between frequencies associated with two nearest supported DCVS levels. To illustrate, a first frequency (e.g., 500 MHz in the above-described example) associated with a first DCVS level may be greater than the first target frequency and a second frequency (e.g., 500 MHz in the above-described example) associated with a second DCVS level may be less than the first target frequency.

In some implementations, the frequency control circuit 108 may obtain the signal that is based on the first target frequency directly from the first processor core 112. For example, the first processor core 112 may generate a signal 120 that is based on the first target frequency, and the first processor core 112 may send the signal 120 to the frequency control circuit 108. In some other implementations, the signal that is based on the first target frequency may be obtained from another component that controls or manages at least some operations of the first processor core 112. For example, in implementations in which the device 102 includes the thread manager 109, the thread manager 109 may generate signals 126 that are based on the first target frequency, and optionally based on target frequencies of other processor cores of the multiple processor cores 110, as further described herein. In this example, the thread manager 109 may send the signals to the frequency control circuit 108, and the frequency control circuit 108 does not receive the signal 120 from the first processor core 112.

In some implementations, either the signal 120 or at least one of the signals 126 indicate or include the first target frequency, which is a different frequency than frequencies associated with the DCVS levels supported by the first processor core 112. For example, the signal 120 (or at least one of the signals 126) may include an indicator (e.g., a value) that represents the first target frequency or that is used to derive the first target frequency, which is between the first frequency and the second frequency associated with the first DCVS level and the second DCVS level, respectively. The indicator may be the first target frequency, an offset from a frequency associated with a nearest DCVS level that corresponds to the first target frequency, a set of bit values that are capable of being mapped to the first target frequency value (e.g., via a lookup table), a value that can be used to derive the first target frequency (e.g., via one or more mathematical operations), or another type of indicator.

Alternatively, either the signal 120 or at least one of the signals 126 may indicate the first frequency associated with the first DCVS level, the second frequency associated with the second DCVS level, and a duty cycle between the first frequency and the second frequency associated with an average operating frequency being based on the first target frequency. For example, the signal 120 (or at least one of the signals 126) may include a first indicator of the first frequency, a second indicator of the second frequency, and a third indicator of the duty cycle. Alternatively, the signal 120 (or at least one of the signals 126) may include a single indicator for the first frequency (or the second frequency), and the frequency control circuit 108 may identify the second frequency (or the first frequency) as the frequency associated with the next higher DCVS level (or the next lower DCVS level). Additional details of the duty cycle are further described herein.

After obtaining either the signal 120 or at least one of the signals 126, the frequency control circuit 108 may cause an operating frequency of the first processor core 112 to cycle between the first frequency and the second frequency during a time interval. The amount of time that the operating frequency is set at each of the two frequencies may be selected such that an average operating frequency of the first processor core during the time interval is based on the first target frequency. For example, the frequency control circuit 108 may cause the operating frequency of the first processor core 112 to be the first frequency for a first time period and the second frequency for a second time period. In this example, the first time period and the second time period are selected such that the average operating frequency of the first processor core 112 is based on the first target frequency. Cycling the operating frequency in this manner may also be referred to as controlling a duty cycle of the operating frequency of the first processor core.

Figure 2:
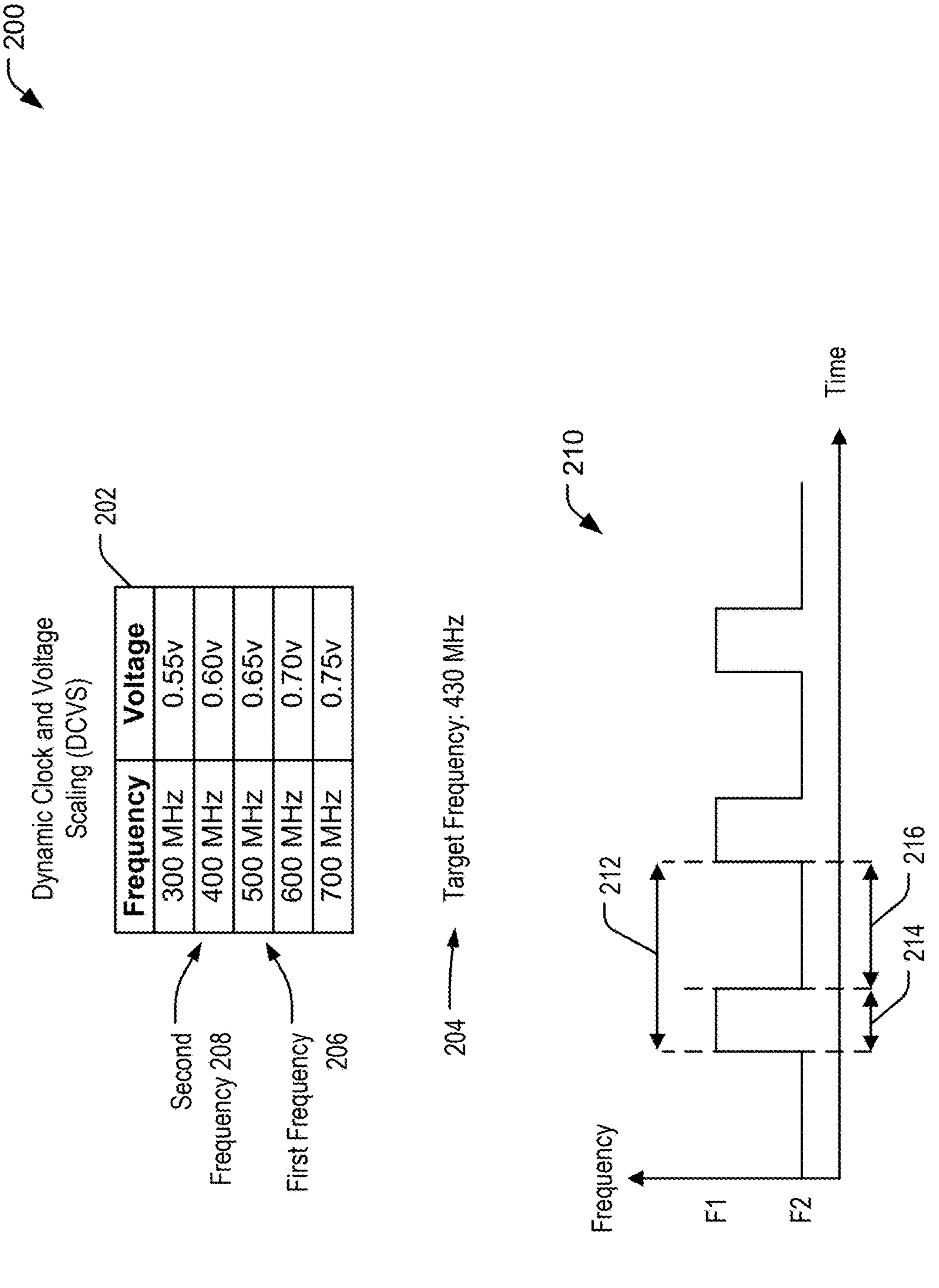
FIG. 2 is a diagram of a particular illustrative aspect of an example of hardware-based cycling of processor core operating frequency that can be performed by the system of FIG. 1, in accordance with some examples of the present disclosure.

As a particular example, if the first frequency is 500 MHZ, the second frequency is 400 MHZ, the first target frequency is 430 MHz, and the time interval is 10 milliseconds (ms), then the first time period is 3 ms and the second time period is 7 ms (e.g., the operating frequency of the first processor core is set to the first frequency for 3 ms and to the second frequency for 7 ms) such that the average operating frequency of the first processor core 112 for an entirety of the time interval is 430 MHZ, as further described herein with reference to FIG. 2. The same cycle of operating frequency may be repeated each time interval until the first target frequency changes or performance is completed at the first processor core 112. Although the average operating frequency of the first processor core 112 is equal to the first target frequency in the above-described example, in other examples the average operating frequency of the first processor core 112 may be substantially equal to the first target frequency (e.g., within predefined tolerance), the average operating frequency may be within a frequency range that includes the first target frequency, the average operating frequency may be substantially equal to a multiple of the first target frequency, or the average operating frequency may be otherwise based on the first target frequency.

To control the operating frequency of the first processor core 112, the frequency control circuit 108 may provide control signals 130 to the first processor core 112. The control signals 130 may indicate an operating frequency setting, an adjustment to the operating frequency, a time period associated with one or more operating frequency settings, other settings, or a combination thereof. For example, the control signals 130 may indicate the first frequency at a first time (e.g., a beginning of, or prior to, the first time period) and the second frequency at a second time (e.g., a beginning of, or prior to, the second time period). As another example, the control signals 130 may indicate a first adjustment (e.g., a difference between the first frequency and a previous operating frequency) at the first time and a second adjustment (e.g., a difference between the second frequency and the first frequency) at the first time. In this manner, the frequency control circuit 108 may send the control signals 130 to the first processor core 112 to cycle the operating frequency of the first processor core 112 during one or more consecutive time intervals (e.g., during one or more instances of each of the first time period and the second time period) such that the average operating frequency during the one or more time intervals matches the first target frequency. Although shown as the frequency control circuit 108 sending the control signals 130 to the first processor core 112, in other implementations, the frequency control circuit 108 may send the control signals 130 to another component that controls the operating frequency of the first processor core 112 (or the multiple processor cores 110), such as the thread manager 109 or another component.

In some implementations, a duration of the time interval (e.g., a combined duration of the first time period and the second period) corresponds to a particular time interval associated with operations performed by the first processor core 112 (or the multiple processor cores 110). As an example, the multiple processor cores 110 may be configured to implement an image processing pipeline, and the time interval (e.g., the combined duration of the first time period and the second period) corresponds to a preconfigured image frame processing time. In other examples, the time interval corresponds to other fixed intervals, such as a fixed audio processing time, a fixed transmission or reception time, or other types of fixed intervals. Setting the time interval for cycling the operating frequency of the multiple processor cores 110 may enable the average operating frequency of the first processor core 112 to remain the same during multiple consecutive time intervals in addition to providing a fixed time interval for use in aligning operating frequency transitions of two or more of the multiple processor cores 110, as further described herein.

In some implementations in which the signal 120 or at least one of the signals 126 indicates the first target frequency, the frequency control circuit 108 identifies the first frequency and the second frequency (e.g., from frequencies associated with supported DCVS levels), the frequency control circuit 108 determines the first time period and the second time period (or the duty cycle), or both, based on the first target frequency. Alternatively, the first processor core 112 (or the thread manager 109) may determine the first frequency and the second frequency, the first time period and the second time period (or the duty cycle), or both, and such information may be included in the signal 120 (or at least one of the signals 126) that is sent to the frequency control circuit 108. In some such implementations, the frequency control circuit 108 may be a less complex circuit that is primarily designed to generate the control signals 130 that cause frequency cycling according to the parameters indicated by the signal 120 (or at least one of the signals 126).

In some implementations, the frequency control circuit 108 controls the operating frequencies of more than one processor core, such as the first processor core 112, the second processor core 114, and the nth processor core 116. To illustrate, in addition to performing the above-described operations with respect to the first processor core 112, the frequency control circuit 108 may obtain a second signal based on a second target frequency for the second processor core 114. In some examples, the frequency control circuit 108 may receive a signal 122 from the second processor core 114. In some other examples, the signals 126 include at least one signal that is based on the second target frequency for the second processor core 114. After the signal 122 or at least one of the signals 126 is obtained, the frequency control circuit 108 may cause an operating frequency of the second processor core 114 to cycle between a third frequency that is greater than the second target frequency and a fourth frequency that is less than the second target frequency such that an average operating frequency of the second processor core 114 is based on the second target frequency. For example, the frequency control circuit 108 may generate control signals 132 that cause the operating frequency of the second processor core 114 to cycle between the third frequency for a third time period and the fourth frequency for a fourth time period. The third frequency may be a frequency associated with a nearest higher DCVS level to the second target frequency, the fourth frequency may be a frequency associated with a nearest lower DCVS level to the second target frequency, and a combined duration of the third time period and the fourth time period may be the same as the time interval described above with respect to the first processor core 112. The third time period may have the same or different duration as the first time period, the second time period, or the fourth time period, and the fourth time period may have the same or different duration as the first time period, the second time period, or the third time period.

Similarly, the frequency control circuit 108 may obtain a signal, such as a signal 124 provided by the nth processor core 116 or at least one of the signals 126, that is based on an nth target frequency of the nth processor core 116. A fifth frequency (e.g., a frequency associated with a nearest higher DCVS level) may be greater than the nth target frequency, and a sixth frequency (e.g., a frequency associated with a nearest lower DCVS level) may be less than the nth target frequency. The frequency control circuit 108 may generate control signals 134 that cause the operating frequency of the nth processor core 116 to cycle between the fifth frequency for a fifth time period and the sixth frequency for a sixth time period, such that the average operating frequency of the nth processor core 116 matches the nth target frequency.

In some implementations, the frequency control circuit 108 controls the voltage regulator 106 to control a voltage of the power rail 104 based on the operating frequencies of one or more of the multiple processor cores 110. For example, the frequency control circuit 108 may generate and send voltage control signals 136 to the voltage regulator 106 to cause the voltage regulator 106 to set the voltage of the power rail 104 at particular levels during particular time periods based on the voltage control signals 136. To illustrate, the voltage control signals 136 may indicate a voltage level for the shared power rail 104 at various times, with the voltage level at a particular time being the highest voltage level (e.g., a maximum voltage) of the multiple processor cores 110 at the particular time. In other implementations, the voltage control signals 136 may indicate voltage levels equal to or based on other aggregates of the voltage levels of the multiple processor cores 110, or another voltage level related to one or more voltages of the multiple processor cores 110. The voltage level indicated by the voltage control signals 136 may be based on the operating frequencies of the multiple processor cores 110. In an example, the voltage level of the first processor core 112 at a first time is based on the operating frequency of the first processor core 112 at the first time, the voltage level of the second processor core 114 at the first time is based on the operating frequency of the second processor core 114 at the first time, and the voltage level of the nth processor core 116 at the first time is based on the operating frequency of the nth processor core 116 at the first time. Examples of voltage levels based on the operating frequencies of the multiple processor cores 110 are further described herein with reference to FIG. 4.

In some implementations, the frequency control circuit 108 may temporally align transitions of operating frequencies of the multiple processor cores 110. In such implementations, the temporally aligned transitions are in the same direction, such as from higher operating frequencies to lower operating frequencies at the multiple processor cores 110, or from lower operating frequencies to higher operating frequencies at the multiple processor cores 110. As an example, the frequency control circuit 108 may generate the control signals 130, the control signals 132, and the voltage control signals 136 to temporally align a first transition of the operating frequency of the first processor core 112 with a second transition of the operating frequency of the second processor core 114. Additional details of temporally aligning operating frequency transitions are described further herein with reference to FIGS. 3-4. In some implementations, the transitions may be temporally aligned with a fixed timing associated with the operations performed by the multiple processor cores 110. For example, the multiple processor cores 110 may be configured to implement an image processing pipeline of a video front end, and the frequency control circuit 108 may temporally align transitions of the operating frequencies of the multiple processor cores 110 with a preconfigured image frame processing time associated with the video front end.

The system 100 thus supports hardware-based control of processor core operating frequency in a manner that reduces power consumption as compared to other systems that employ DCVS levels. For example, by cycling the operating frequency of the first processor core 112 between the first frequency and the second frequency (e.g., the two frequencies associated with the nearest supported DCVS levels), the first processor core 112 may be operated at a lower frequency (e.g., the target frequency) than a nearest frequency (e.g., the first frequency) of a DCVS level that satisfies a voltage criterion associated with operations at the first processor core 112. A technical effect of cycling the operating frequency of the first processor core 112 between these two frequencies is to reduce power consumption at the system 100 (e.g., at the device 102) as compared to setting the operating frequency at the first frequency, while still satisfying the voltage criterion. Additionally, the system 100 supports operational frequency control for the multiple processor cores 110 that temporally aligns the transitions between frequencies in a common direction (e.g., either increasing frequency or decreasing frequency) across the first processor core 112, the second processor core 114, and the nth processor core 116, as further described herein with reference to FIGS. 3 and 4. A technical effect of this temporal alignment of transitions is to reduce the amount of time the power rail 104 operates at the higher voltage as compared to cycling the operating frequency of each of the multiple processor cores 110 without temporal alignment of particular operating frequency transitions, which may reduce the overall power consumption of the system 100 (e.g., the device 102).

Referring to FIG. 2, a diagram of a particular illustrative aspect of an example of hardware-based cycling of processor core operating frequency that can be performed by the system 100 of FIG. 1, in accordance with some examples of the present disclosure, is shown and designated 200. The example 200 shown in FIG. 2 includes a DCVS table 202 and a graph of an operating frequency 210, such as an operating frequency of the first processor core 112 of FIG. 1. The values in the DCVS table 202 and the graph are illustrative, and in other examples, the DCVS table 202 may include other values, the graph may include other values, or both.

In the example shown in FIG. 2, a processor core, such as the first processor core 112 of FIG. 1, supports five DCVS levels shown in the DCVS table 202. The supported DCVS levels include a first DCVS level associated with a first frequency (e.g., 300 MHz) and a first voltage level (e.g., 0.55 volts), a second DCVS level associated with a second frequency (e.g., 400 MHZ) and a second voltage level (e.g., 0.60 volts), a third DCVS level associated with a third frequency (e.g., 500 MHz) and a third voltage level (e.g., 0.65 volts), a fourth DCVS level associated with a fourth frequency (e.g., 600 MHZ) and a fourth voltage level (e.g., 0.70 volts), and a fifth DCVS level associated with a fifth frequency (e.g., 700 MHZ) and a fifth voltage level (e.g., 0.75 volts). Although the DCVS table 202 is described as including five entries having associated frequencies that are each spaced apart by 100 MHz and associated voltage levels that are spaced apart by 0.05 volts, in other examples, the DCVS table 202 may include fewer than five or more than five entries, associated frequencies of the entries may be spaced apart by less than or more than 100 MHZ, associated voltage levels of the entries may be spaced apart by less than or more than 0.05 volts, or a combination thereof.

When the first processor core 112 is designated to perform a set of operations, the first processor core 112 may determine an operating frequency that satisfies a voltage criterion associated with the set of operations, such as a target frequency 204. In this example, the target frequency 204 is 430 MHz. In other examples, the target frequency 204 may be less than or greater than 430 MHz, such that operation at the target frequency causes an operational voltage of the first processor core 112 to satisfy the voltage criterion. In at least some examples, the target frequency 204 is between two nearest frequencies associated with adjacent entries in the DCVS table 202. In these examples, if the operating frequency is set at either of the frequencies associated with entries in the DCVS table 202, the operating frequency will either be too low, such that the operating voltage level fails to satisfy the voltage criterion and can result in performance degradation, or too high, such that the operating voltage exceeds the voltage criterion and thus results in inefficient operation with excess power consumption. To illustrate, setting the operating frequency of the first processor core 112 to match a first frequency (e.g., 500 MHz) that is greater than the target frequency 204 can result in an operational voltage that is higher than necessary to satisfy the voltage criterion, and thus consumes excess power. Alternatively, setting the operating frequency of the first processor core 112 to match a second frequency (e.g., 400 MHZ) that is less than the target frequency 204 can result in an operational voltage that does not satisfy the voltage criterion, which can degrade performance of the first processor core 112.

Instead of operating the first processor core 112 at the nearest higher frequency associated with a level of the DCVS table 202, the frequency control circuit 108 may cause an operating frequency 210 of the first processor core 112 to cycle between the first frequency 206 and the second frequency 208 such that an average operating frequency of the first processor core 112 during a time interval 212 is based on the target frequency 204. During a first time period 214, the operating frequency 210 is set at the first frequency 206 (e.g., 500 MHZ, also represented as "F1" in FIG. 2). At the end of the first time period 214, the frequency control circuit 108 causes the operating frequency 210 to transition to the second frequency 208 and, during a second time period 216, the operating frequency 210 is set at the second frequency 208 (e.g., 400 MHz, also represented as "F2" in FIG. 2). With appropriate selection of the first time period 214 and the second time period 216, an average of the operating frequency 210 (e.g., the average operating frequency of the first processor core 112) during an entirety of the time interval 212 matches the target frequency 204 (e.g., 430 MHz). For example, if the first time period 214 is approximately 30% of the time interval 212, and the second time period 216 is approximately 70% of the time interval 212, the average operating frequency is 0.3*500+0.7*400=430 MHz (e.g., the target frequency 204).

In this manner, the frequency control circuit 108 may cycle the operating frequency 210 of the first processor core 112 between the first frequency 206 (e.g., for the first time period 214) and the second frequency 208 (e.g., for the second time period 216), to achieve an average operating frequency that matches the target frequency 204. The same cycling may continue for each successive time interval 212 during performance of the set of operations at the first processor core 112. In some implementations, the first processor core 112 may implement part of an image processing pipeline, and the time interval corresponds to a preconfigured image frame processing time. In such implementations, the operating frequency 210 may be cycled between the first frequency 206 and the second frequency 208 for the first time period 214 and the second time period 216, respectively, such that the average operating frequency of the first processor core 112 is the target frequency 204 for each image frame processing time of one or more images processed by the image processing pipeline. A technical advantage of cycling the operating frequency 210 in this manner is the ability to operate a processor core (e.g., the first processor core 112) at an average operating frequency that is lower than a frequency associated with DCVS levels in the DCVS table 202 while also satisfying a voltage criterion, thus providing a finer granularity of operating frequencies that more efficiently utilize processor and power resources than are provided by the supported DCVS levels.

Figure 3:
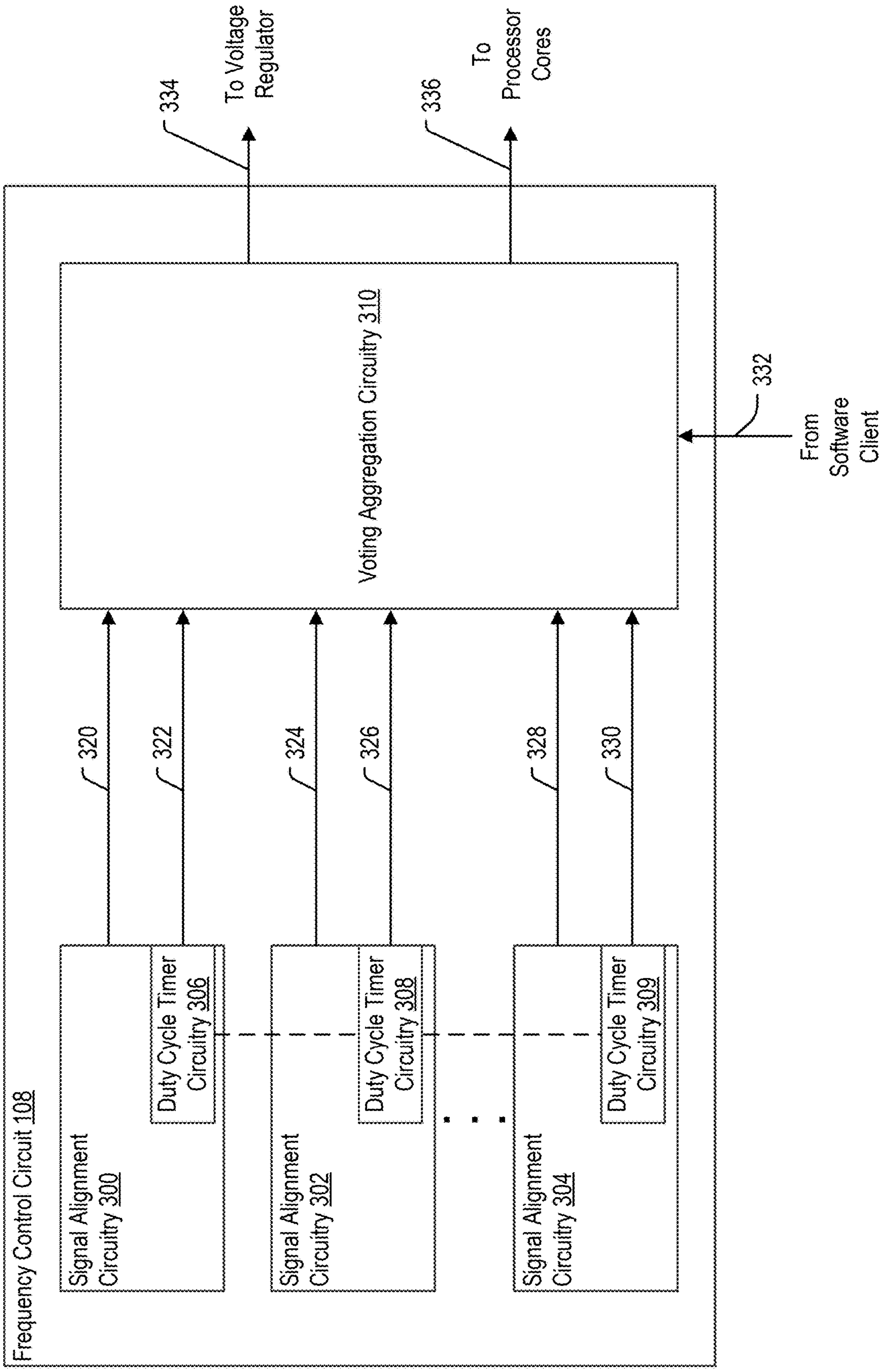
FIG. 3 is a block diagram of a particular illustrative aspect of the frequency control circuit operable to perform hardware-based control of processor core operating frequency, in accordance with some examples of the present disclosure.

FIG. 3 illustrates a particular illustrative aspect of the frequency control circuit 108 of the system 100 of FIG. 1, in accordance with some examples of the present disclosure. The frequency control circuit 108 includes a plurality of components that are configured to enable performance of hardware-based operating frequency control for the multiple processor cores 110. In the example shown, the frequency control circuit 108 includes first signal alignment circuitry 300, second signal alignment circuitry 302, nth signal alignment circuitry 304, and voting aggregation circuitry 310. The example shown in FIG. 3 is illustrative, and in other implementations, the frequency control circuit 108 may include fewer or more components, or different components, than illustrated in FIG. 3. For example, although shown as individual components, in other implementations, the operations of the signal alignment circuitries 300-304 may be performed by a single component (e.g., a single instance of signal alignment circuitry).

The signal alignment circuitries 300-304 are each configured to generate "voting signals" (e.g., control signals) to cause the operating frequency of a corresponding processor core to cycle between two frequencies (e.g., the frequencies of two DCVS levels) such that particular types of operating frequency transitions are temporally aligned across the multiple processor cores 110. To illustrate, the first signal alignment circuitry 300 may be configured to generate voting signals for controlling the operating frequency of the first processor core 112, the second signal alignment circuitry 302 may be configured to generate voting signals for controlling the operating frequency of the second processor core 114, and the nth signal alignment circuitry 304 may be configured to generate voting signals for controlling the operating frequency of the nth processor core 116. The voting signals may cause the respective operating frequencies to transition from a relative lower frequency to a relative higher frequency (e.g., based on up votes) at the same time, or to transition from a relative higher frequency to a relative lower frequency (e.g., based on down votes) at the same time, as further described herein. In some implementations, the signal alignment circuitries 300-304 may receive or share control signal(s) (shown as dotted lines in FIG. 3) to align generation of voting signals to particular times, as further described below. Although three signal alignment circuitries 300-304 are shown in FIG. 3, in other implementations, the frequency control circuit 108 may include fewer than three or more than three signal alignment circuitries (e.g., n may be less than three or more than three, where n is the number of processor cores of the multiple processor cores 110 of FIG. 1 and the number of signal alignment circuitry in FIG. 3).

The signal alignment circuitries 300-304 may include respective duty cycle timing circuitry that is configured to track a duty cycle of the operating frequency of the respective processor core and to generate voting signals to cause a transition of the operating frequency of the respective processor core, such that the average operating frequency of the respective processor core matches (or is based on) a respective target frequency. The duty cycle timing circuitry may include hardware timers or other hardware timing mechanisms to track time periods such that the operating frequency of the corresponding processor core may be cycled at the appropriate time to achieve an average operating frequency that matches the respective target operating frequency. In some examples, the first signal alignment circuitry 300 includes first duty cycle timer circuitry 306 configured to track a time period (e.g., with respect to a duty cycle) during which the operating frequency of the first processor core 112 is a particular frequency, the second signal alignment circuitry 302 includes second duty cycle timer circuitry 308 configured to track a time period (e.g., with respect to a duty cycle) during which the operating frequency of the second processor core 114 is a particular frequency, and the nth signal alignment circuitry 304 includes nth duty cycle timer circuitry 309 configured to track a time period (e.g., with respect to a duty cycle) during which the operating frequency of the nth processor core 116 is a particular frequency. The duty cycle of the operating frequency may be different for each of the multiple processor cores 110, or at least some of the multiple processor cores 110 may be associated with the same duty cycle. Because the multiple processor cores 110 may each be associated with a different duty cycle, each of the signal alignment circuitries 300-304 may integrate separate duty cycle timer circuitry to support independent operating frequency cycling at each of the multiple processor cores 110.

The voting aggregation circuitry 310 may be configured to receive voting signals from the signal alignment circuitries 300-304 and to generate control signals based on the voting signals. The control signals include one or more control signals for controlling the operating frequency of the respective processor cores as well as one or more control signals for controlling the voltage regulator 106. For example, the voting aggregation circuitry 310 may be configured to provide control signals that control the operating frequency of a respective processor core based on whether the voting signals from the respective signal alignment circuitry indicate to increase the operating frequency (e.g., to the higher frequency) or to decrease the frequency (e.g., to the lower frequency). Additionally, the voting aggregation circuitry 310 may be configured to aggregate the voting signals from the signal alignment circuitries 300-304 to configure a voltage level to be output by the voltage regulator 106, as further described below.

During operation, the signal alignment circuitries 300-304 may generate voting signals to cause operating frequencies of respective processor cores to cycle between a relative higher frequency and a relative lower frequency such that average operating frequencies of the processor cores are based on respective target frequencies. The cycling of the operating frequencies of the various processor cores may be temporally aligned so that particular types of frequency transitions occur at the same time for each of the multiple processor cores 110. To preserve the capability of individually cycling the operating frequency of each processor core, frequency transitions of one type (e.g., transitions that either increase or decrease operating frequency) may occur at the same time and frequency transitions of another type (e.g., transitions that either decrease or increase operating frequency) may occur at different times than one another.

In some implementations, the particular type of frequency transition corresponds to increasing the operating frequency. To illustrate, if the first processor core 112 is being cycled between a first frequency and a second frequency that is less than the first frequency, the second processor core 114 is being cycled between a third frequency and a fourth frequency that is less than the third frequency, and the nth processor core 116 is being cycled between a fifth frequency and a sixth frequency that is less than the fifth frequency, the first signal alignment circuitry 300 may output a first voting signal 320 at the same time as the second signal alignment circuitry 302 outputs a third voting signal 324 and the nth signal alignment circuitry 304 outputs a fifth voting signal 328. The voting signals 320, 324, and 328 may be referred to as "vote up" or "up vote" signals, because these signals represent a request to increase the operating frequency of the respective processor core. The voting aggregation circuitry 310 may generate control signals 336 (e.g., the control signals 130-134) that are provided to the multiple processor cores 110 to cause the operating frequencies of the first processor core 112, the second processor core 114, and the nth processor core 116 to transition to the first frequency, the third frequency, and the fifth frequency, respectively, at the same time.

Upon generating the voting signals 320, 324, and 328, the signal alignment circuitries 300-304, respectively, may cause respective duty cycle time circuitry to begin timers and, when the timers reach values associated with transitions away from the relatively higher frequencies, the signal alignment circuitries 300-304 may cycle the operating frequencies of the respective processor cores to the relatively lower frequencies. For example, if operating the first processor core 112 at the first frequency for a first time period and the second frequency for a second time period cause the average operating frequency of the first processor core 112 to match a first target frequency, the first duty cycle timer circuitry 306 may maintain a timer that tracks the first time period, and upon expiration of the first time period, the first signal alignment circuitry 300 may output a second voting signal 322 to cause the operating frequency of the first processor core 112 to be decreased to the second frequency. Similarly, the second duty cycle timer circuitry 308 may track a time period associated with operating the second processor core 114 at the third frequency, and upon expiration of the timer, the second signal alignment circuitry 302 may output a fourth voting signal 326 to cause the operating frequency of the second processor core 114 to be decreased to the fourth frequency. As another example, the nth duty cycle timer circuitry 309 may track a time period associated with operating the nth processor core 116 at the fifth frequency, and upon expiration of the timer, the nth signal alignment circuitry 304 may output a sixth voting signal 330 to cause the operating frequency of the nth processor core 116 to be decreased to the sixth frequency.

The voting signals 322, 326, and 330 may be referred to as "vote down" or "down vote" signals, because the signals represent a request to decrease the operating frequencies of the respective processor cores. The voting aggregation circuitry 310 may modify the control signals 336 (e.g., the control signals 130-134) based on the voting signals 322, 326, 330 to cause the operating frequencies of the first processor core 112, the second processor core 114, and the nth processor core 116 to transition to the second frequency, the fourth frequency, and the sixth frequency, respectively. Because each of the processor cores 112-116 may be associated with different target frequencies, the voting signals 322, 326, 330 may transition at different times, resulting in transitions of the operating frequencies of the processor cores 112-116 occurring at different times.

For example, the first duty cycle timer circuitry 306 may cause the first signal alignment circuitry 300 to assert the second voting signal 322, and to de-assert the first voting signal 320, at a first down vote time that is determined based on a first target frequency associated with the first processor core 112. The first down vote time may be different than a second down vote time at which the second signal alignment circuitry 302 asserts the fourth voting signal 326 (and de-asserts the third voting signal 324) or a third down vote time at which the nth signal alignment circuitry 304 asserts the sixth voting signal 330 (and de-asserts the fifth voting signal 328). Although separate vote up and vote down signals are described, in other implementations, each of the signal alignment circuitries 300-304 may output a single voting signal, and a value of each voting signal may indicate a vote up condition (e.g., to increase the operating frequency to the relatively higher frequency) when the voting signal has a first value and a vote down condition (e.g., to decrease the operating frequency to the relatively lower frequency) when the voting signal has a second value.

In some other implementations, the particular type of frequency transition corresponds to decreasing the operating frequency. To illustrate, the first signal alignment circuitry 300 may output the second voting signal 322 (e.g., a down vote signal) at the same time as the second signal alignment circuitry 302 outputs the fourth voting signal 326 and the nth signal alignment circuitry 304 outputs the sixth voting signal 330. The voting aggregation circuitry 310 may generate the control signals 336 (e.g., the control signals 130-134) that are provided to the multiple processor cores 110 to cause the operating frequencies of the first processor core 112, the second processor core 114, and the nth processor core 116 to transition to the second frequency, the fourth frequency, and the sixth frequency, respectively, at the same time. Additionally, upon generating the voting signals 322, 326, and 330, the signal alignment circuitries 300-304 may cause the duty cycle time circuitries 306-309, respectively, to begin timers. When the timers reach values associated with transitions to the relative lower frequencies, the signal alignment circuitries 300-304 may output (e.g., assert) the voting signals 320, 324, and 328, (and de-assert the voting signals 322, 326, and 330), respectively, to cause the voting aggregation circuitry 310 to modify the control signals 336 to cycle the operating frequencies of the processor cores 112-116 to the first frequency, the third frequency, or the fifth frequency, respectively. In some examples, the voting signals 320, 324, and 326 may occur at different times, based on the target frequencies associated with the processor cores 112-116, resulting in transitions of the operating frequencies of the processor cores 112-116 occurring at different times.

The voting aggregation circuitry 310 may also generate the control signal 334 based on the voting signals 320-330. The control signal 334 may include or correspond to one of the voltage control signals 136 and be provided to the voltage regulator 106 to control the output voltage of the voltage regulator 106. In some implementations, the control signal 334 indicates a voltage that is based on an aggregation of voltages associated with the operating frequencies of the multiple processor cores 110. To illustrate, if the first processor core 112 is being operated at the first frequency that is associated with a first voltage level, the second processor core 114 is being operated at the third frequency that is associated with a third voltage level, and the nth processor core 116 is being operated at the fifth frequency that is associated with a fifth voltage level, the control signal 334 may indicate a voltage level that is aggregated based on the first voltage level, the third voltage level, and the fifth voltage level. Alternatively, if the first processor core 112 is being operated at the second frequency that is associated with a second voltage level that is less than the first voltage level, the second processor core 114 is being operated at the fourth frequency that is associated with a fourth voltage level that is less than the third voltage level, and the nth processor core 116 is being operated at the sixth frequency that is associated with a sixth voltage level that is less than the fifth voltage level, the control signal 334 may indicate a voltage level that is aggregated based on the second voltage level, the fourth voltage level, and the sixth voltage level. By outputting the control signal 334 that indicates the aggregate voltage level, the frequency control circuit 108 may cause the voltage regulator 106 to control a voltage of the power rail 104 (e.g., a shared power rail) based on the operating frequencies of the multiple processor cores 110.

The aggregate voltage level determined by the voting aggregation circuitry 310 and indicated by the control signal 334 may be any value that is based on the multiple voltage levels associated with the operating frequencies of the processor cores 112-116. For example, the aggregate voltage level may be a maximum voltage level (e.g., a maximum voltage requirement) of the processor cores 112-116 at a given time. In some implementations, if any of the voltage levels are associated with respective high frequencies, the aggregate voltage level is based only on the voltage levels associated with the respective high frequencies (e.g., the voting aggregation circuitry 310 does not consider any voltage levels associated with lower frequencies when determining the aggregate voltage level). For example, if transitions that increase operating frequency are temporally aligned such that the first processor core 112 is being operated at the first frequency, the second processor core 114 is being operated at the third frequency, and the nth processor core 116 is being operated at the fifth frequency at a first time, the voting aggregation circuitry 310 may generate the control signal 334 (e.g., the aggregate voltage level) at the first time based on the first voltage level associated with the first frequency, the third voltage level associated with the third frequency, and the fifth voltage level associated with the fifth frequency.

As another example, if at a later time the first processor core 112 is being operated at the first frequency, the second processor core 114 is being operated at the fourth frequency that is less than the third frequency, and the nth processor core 116 is being operated at the fifth frequency, the voting aggregation circuitry 310 may generate the control signal 334 (e.g., the aggregate voltage level) at the later time based on the first voltage level and the fifth voltage level. In this example, the voting aggregation circuitry 310 may exclude the fourth voltage level associated with the fourth frequency when determining the aggregate voltage level. In other implementations, the control signal 334 (e.g., the aggregate voltage level) is based on voltage levels associated with the operating frequencies of each of the processor cores 112-116, regardless of whether the operating frequencies are relatively higher or relatively lower, respectively.

In some implementations, the frequency control circuit 108 may receive an external voting signal 332, and the voting aggregation circuitry 310 may determine the control signal 334 (e.g., the aggregate voltage level) based on the external voting signal 332 and one or more of the voting signals 320-330. The external voting signal 332 may be provided by a software client, a hypervisor, or another component, as a backup voting signal or a voting signal used for particular use case transitions during which performance failure may occur from a voltage level based solely on the voting signals 320-330. For example, during a use case transition associated with the multiple processor cores 110, such as a transition from implementing an image processing pipeline to implementing a network decoder, the external voting signal 332 may provide signaling that causes determination of an aggregate voltage level that is high enough to support the use case transition by the multiple processor cores 110, despite the use case transition not being completed to the point that the voting signals 320-330 provide voting associated with the new use case. The voting aggregation circuitry 310 may aggregate the external voting signal 332 with the voting signals 320-330, or the external voting signal 332 may be designated as an override signal, and the voting aggregation circuitry 310 may determine the aggregate voltage based on the external voting signal 332 and not the voting signals 320-330 if the external voting signal 332 has a particular value (e.g., is asserted).

As described above with reference to FIG. 3, the frequency control circuit 108 can cycle the operating frequencies of multiple processor cores between frequencies associated with DCVS levels supported by the respective processor cores. The frequency control circuit 108 may cycle the operating frequencies according to individual duty cycles while also temporally aligning frequency transitions in a particular direction (e.g., either transitions that increase operating frequency or transitions that decrease operating frequency) across multiple processor cores. A technical advantage of the frequency control circuit 108 cycling operating frequencies in this manner is to cause average operating frequencies of multiple processor cores to match respective target frequencies, and a technical advantage of temporally aligning the transitions is to reduce the amount of time that a higher voltage is provided by a shared power rail (e.g., the power rail 104), as further described herein with reference to FIG. 4.

Figure 4:
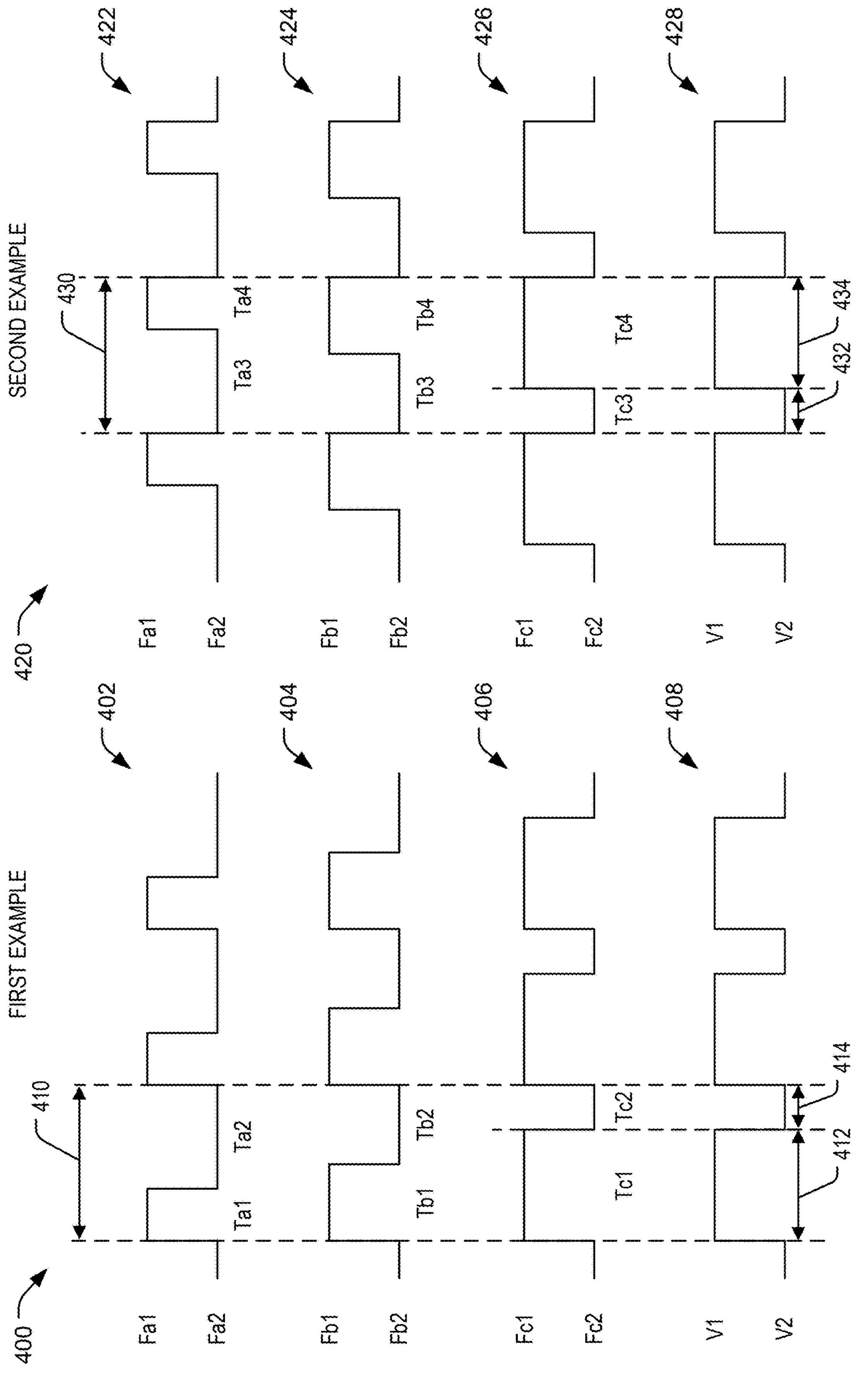
FIG. 4 is a diagram of illustrative aspects of examples of hardware-based operating frequency cycling for multiple processor cores, in accordance with some examples of the present disclosure.

FIG. 4 illustrates a diagram of illustrative aspects of examples of hardware-based operating frequency cycling for multiple processor cores, in accordance with some examples of the present disclosure. FIG. 4 depicts a first example 400 that is associated with a first type of timing alignment and a second example 420 that is associated with a second type of timing alignment. In some implementations, the operations associated with the first example 400, the second example 420, or both, are performed by the frequency control circuit 108 of FIGS. 1 and 3. The values of operating frequencies and voltage values discussed with reference to the first example 400 and the second example 420 are illustrative, and in other examples, the first example 400 may include other operating frequencies and voltage values, the second example 420 may include other operating frequencies and voltage values, or both.

The first example 400 includes a graph of an operating frequency 402 of a first processor core (e.g., the first processor core 112 of FIG. 1), a graph of an operating frequency 404 of a second processor core (e.g., the second processor core 114 of FIG. 1), and a graph of an operating frequency 406 of an nth processor core (e.g., the nth processor core 116 of FIG. 1). In the first example 400, the operating frequency of each of the corresponding processor cores may be cycled between two frequencies, such as frequencies associated with two consecutive DCVS levels, as shown by the graphs in FIG. 4. To illustrate, the operating frequency 402 may be cycled between a first frequency Fa1 and a second frequency Fa2 that is less than the first frequency Fa1, the operating frequency 404 may be cycled between a third frequency Fb1 and a fourth frequency Fb2 that is less than the third frequency Fb1, and the operating frequency 406 may be cycled between a fifth frequency Fc1 and a sixth frequency Fc2 that is less than the fifth frequency Fc1. In some implementations, the relatively higher frequencies Fa1, Fb1, and Fc1 are the same, and the relatively lower frequencies Fa2, Fb2, and Fc2 are the same. In some other implementations, at least some of the frequencies Fa1, Fb1, and Fc1 are different from others of the relatively higher frequencies, at least some of the frequencies Fa2, Fb2, and Fc2 are different than others of the relatively lower frequencies, or both. In some implementations, each of the relatively higher frequencies Fa1, Fb1, and Fc1 are higher frequency than each of the relatively lower frequencies Fa2, Fb2, and Fc2.

The operating frequency of each of the processor cores may be cycled independently, such that the amount of time operating at the corresponding higher frequency may be different between one or more processor cores, although particular types of transitions may be temporally aligned. The timing of the transitions in the operating frequencies 402-406, and the duty cycles of the corresponding processor cores, may be based on respective target operating frequencies to be achieved during a time interval 410. For example, the amount of time that a processor core is operated at a relatively higher frequency and the amount of time that the processor core is operated at a relatively lower frequency may be selected such that the average operating frequency during both time periods (e.g., during the time interval 410) matches or is otherwise based on a target frequency that satisfies a corresponding voltage criterion associated with the processor core. In the first example 400, the operating frequency 402 is set at the first frequency Fa1 for a first time period Ta1 and at the second frequency Fa2 for a second time period Ta2, the operating frequency 404 is set at the third frequency Fb1 for a third time period Tb1 and at the fourth frequency Fb2 for a fourth time period Tb2, and the operating frequency 406 is set at the fifth frequency Fc1 for a fifth time period Tc1 and at the sixth frequency Fc2 for a sixth time period Tc2. In some examples, the durations of Ta1, Tb1, and Tc1 are the same and the durations of Ta2, Tb2, and Tc2 are the same. In other examples, one or more of the durations of Ta1, Tb1, or Tc1 may be different from the others, one or more of the durations of Ta2, Tb2, or Tc2 may be different from the others, or both.

The time periods Ta1, Ta2, Tb1, Tb2, Tc1, and Tc2 may be selected such that the average operating frequency of the various processor cores matches respective target operating frequencies over the time interval 410. In some examples, a duration of the time interval 410 is the same as each of the combined durations of Ta1 and Ta2, the combined durations of Tb1 and Tb2, and the combined durations of Tc1 and Tc2. Additionally, Ta1 and Ta2 may be selected such that an average of the operating frequency 402 (e.g., an average operating frequency of the first processor core 112) during the time interval 410, given by the expression (Fa1*Ta1+Fa2*Ta2)/(Ta1+Ta2), matches a first target frequency Targ1. Similarly, Tb1, Tb2, Tc1, and Tc2 may be selected such that an average of the operating frequency 404 during the time interval 410, given by the expression (Fb1*Tb1+Fb2*Tb2)/(Tb1+Tb2), and an average of the operating frequency 406 during the time interval 410, given by the expression (Fc1*Tc1+Fc2*Tc2)/(Tc1+Tc2), matches a second target frequency Targ2 and a third target frequency Targ3, respectively.

The first example 400 also includes a graph of a voltage 408 of a shared power rail (e.g., the power rail 104 of FIG. 1) that is coupled to the multiple processor cores 110 during the time interval 410. The voltage 408 may be based on the operating frequencies 402-406, such that when any of the operating frequencies 402-406 are set at a relatively high frequency (e.g., the frequencies Fa1, Fb1, and Fc1), the voltage 408 is set at a first voltage level V1 that is based on an aggregate voltage associated with the frequencies Fa1, Fb1, and Fc1. Additionally, when each of the operating frequencies 402-406 are set at a relatively low frequency (e.g., the frequencies Fa2, Fb2, and Fc2), the voltage 408 is set at a second voltage level V2 that is based on an aggregate voltage associated with the frequencies Fa2, Fb2, and Fc2. In some examples, the first voltage level V1 may be a maximum (e.g., a highest voltage) of the voltages associated with the frequencies Fa1, Fb1, and Fc1 (e.g., operating voltages caused by operating the multiple processor cores 110 at the respective operating frequencies). Similarly, the second voltage level V2 may be a maximum of the voltages associated with the frequencies Fa2, Fb2, and Fc2.

In the first example 400, the voltage 408 is set at the first voltage level V1 for a first sub-interval 412 of the time interval 410 before transitioning to the second voltage level V2 for a second sub-interval 414 of the time interval 410. In this example, the duration of the time interval 410 is the same as a combined duration of the first sub-interval 412 and the second sub-interval 414. In some implementations, the duration of the first sub-interval 412 is the same as the duration of the longest time period associated with a relative higher frequency for one of the operating frequencies 402-406. In the first example 400, the first sub-interval 412 is the same as the fifth time period Tc1 due to the fifth time period Tc1 being greater than the third time period Tb1 and the third time period Tb1 being greater than the first time period Ta1. As such, the first sub-interval 412 represents a time period during which at least one of the multiple processor cores 110 is being operated at a relatively higher frequency. When the operating frequency 406 transitions to the sixth frequency Fc2 (e.g., when the last of the operating frequencies 402-406 transitions from a relatively higher frequency to a relatively lower frequency), the voltage 408 transitions to the second voltage level V2 for the second sub-interval 414. As such, the second sub-interval 414 represents a time period during which each of the operating frequencies 402-406 are set at a relatively lower frequency. Although shown as cycling between two voltage levels, in other implementations, the voltage 408 may transition to a different voltage level each time there is a transition in one of the operating frequencies 402-406.

To reduce the amount of time that the voltage 408 is set at the first voltage level V1, transitions of the operating frequencies 402-406 in the same direction may be temporally aligned. In some implementations, transitions that increase operating frequency (e.g., that transition from a lower frequency to a higher frequency) are temporally aligned. In the first example 400, the operating frequencies 402-406 may each be cycled to a relatively higher frequency (e.g., Fa1, Fb1, and Fc1, respectively) at a start of the time interval 410. If the target frequencies associated with the processor cores are different, the operating frequencies 402-406 may be individually cycled after the initial alignment such that transitions from a relatively higher frequency to a relatively lower frequency can occur at different times for one or more of the operating frequencies 402-406. Stated another way, the first time period Ta1, the third time period Tb1, and the fifth time period Tc1 may have different durations. Additionally, after the operating frequencies 402-406 are set at the relatively lower frequencies during the second sub-interval 414, each of the operating frequencies 402-406 may transition to respective higher frequencies at a start of a new time interval immediately following the time interval 410. In this manner, at the beginning of each time interval, the operating frequencies 402-406 may be cycled from relatively lower frequencies to relatively higher frequencies at the same time. In some implementations, the time interval 410 is an image frame processing time associated with an image processing pipeline implemented by the multiple processor cores 110, such that in the first example 400, the operating frequencies 402-406 transition to the relatively higher frequencies at the start of processing each frame of image data.

In some other implementations, transitions that decrease the operating frequency are temporally aligned. For example, the second example 420 includes an operating frequency 422 of the first processor core 112, an operating frequency 424 of the second processor core 114, and an operating frequency 426 of the nth processor core 116. In the second example 420, each of the operating frequencies 422-426 may be cycled to a relatively lower frequency (e.g., Fa2, Fb2, and Fc2, respectively) at a start of a time interval 430. If the target frequencies associated with the processor cores are different, the operating frequencies 422-426 may be individually cycled after the initial alignment such that transitions from a relatively lower frequency to a relatively higher frequency can occur at different times for one or more of the operating frequencies 422-426. To illustrate, the operating frequency 422 may be set at the second frequency Fa2 for a first time period Ta3 and the first frequency Fa1 for a second time period Ta4, the operating frequency 424 may be set at the fourth frequency Fb2 for a third time period Tb3 and the third frequency Fb1 for a fourth time period Tb4, and the operating frequency 426 may be set at the sixth frequency Fc2 for a fifth time period Tc3 and the fifth frequency Fc1 for a sixth time period Tc4. In this example, the first time period Ta3, the third time period Tb3, and the fifth time period Tc3 may have different durations due to the individual cycling of the operating frequencies 422-426. Additionally, after being set at the relatively higher frequencies during the time periods Ta4, Tb4, and Tc4, the operating frequencies 422-426 may transition to respective lower frequencies at a start of a new time interval immediately following the time interval 430. In this manner, at the beginning of each time interval, the operating frequencies 422-426 may be cycled from relatively higher frequencies to relatively lower frequencies. In some implementations, the time interval 430 is an image frame processing time associated with an image processing pipeline implemented by the multiple processor cores 110, such that in the second example 420, the operating frequencies 422-426 transition to the relatively lower frequencies at the start of processing each frame of image data.

Similarly, a voltage 428 may cycle between the second voltage level V2 and the first voltage level V1 based on the operating frequencies 422-426. In the second example 420, the voltage 428 is set at the second voltage level V2 for a first sub-interval 432 of the time interval 430 before transitioning to the first voltage level V1 for a second sub-interval 434 of the time interval 430. In some implementations, the duration of the first sub-interval 432 is the same as the duration of the shortest time period associated with one of the operating frequencies 422-426 being set at a relative higher frequency. In the second example 420, the first sub-interval 432 is the same as the fifth time period Tc3 because the fifth time period Tc3 is less than the third time period Tb3, and the third time period Tb3 is less than the first time period Ta3. As such, the first sub-interval 432 represents a time period during which each of the operating frequencies 422-426 are set at a relatively lower frequency. When the operating frequency 426 transitions to the fifth frequency Fc1, the voltage 428 transitions to the first voltage level V1 for the second sub-interval 434, such that the second sub-interval 434 represents a time period during which at least one of the operating frequencies 422-426 are set at a relatively higher frequency.

Thus, although transitions of operating frequencies can be temporally aligned for either increasing frequency transitions or decreasing frequency transitions, both signal alignment schemes result in similar fixed amount of time that the voltage level of the power rail 104 is at the first voltage level V1 (e.g., a higher voltage level). The signal alignment may be performed by the signal alignment circuitries 300-304 of FIG. 3 timing a particular type of operating frequency transition at common times, which may result in generation of the control signal 334 (e.g., the voltage control signals 136) that set a voltage of the power rail 104 of FIG. 1. A technical advantage of such signal alignment schemes is to reduce the amount of time that the higher voltage is used to power the multiple processor cores 110, thereby decreasing power consumption, as compared to operating frequency cycling each processor core independently with no temporal alignment, which may result less time during which the lower voltage level (e.g., the second voltage level V2) is applied to the power rail 104.

Figure 5:
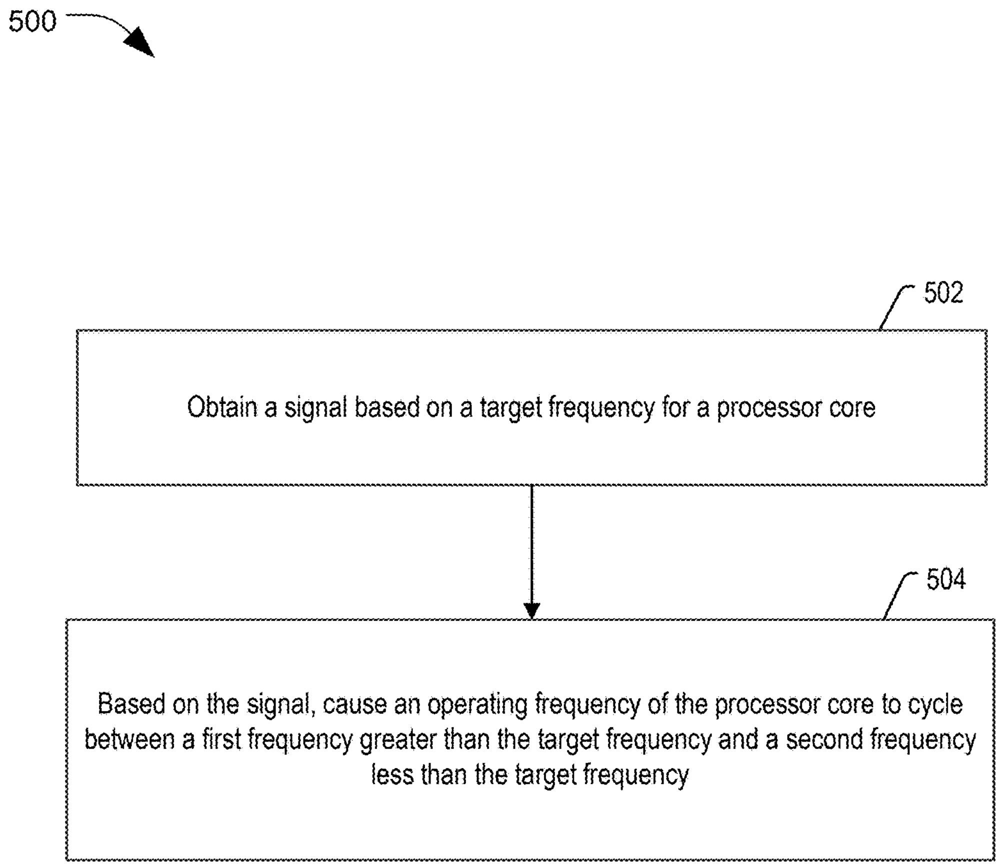
FIG. 5 is a diagram of a particular implementation of a method of hardware-based control of processor core operating frequency that may be performed by the system of FIG. 1, in accordance with some examples of the present disclosure.

Referring to FIG. 5, a particular implementation of a method 500 of hardware-based control of processor core operating frequency is shown. In a particular aspect, one or more operations of the method 500 are performed at least by one of the frequency control circuit 108 of FIGS. 1 and 3, the device 102, the system 100 of FIG. 1, or a combination thereof.

The method 500 includes obtaining a signal based on a target frequency for a processor core, at block 502. For example, the frequency control circuit 108 may obtain a signal (e.g., the signal 120 or the signals 126) that is based on a target frequency for the first processor core 112. In some implementations, the frequency control circuit 108 receives the signal 120 from the first processor core 112. In some other implementations, the frequency control circuit 108 receives the signals 126 from the thread manager 109.

The method 500 also includes, based on the signal, causing an operating frequency of the processor core to cycle between a first frequency greater than the target frequency and a second frequency less than the target frequency, at block 504. For example, the frequency control circuit 108 may generate the control signals 130 that cause the operating frequency of the first processor core 112 to cycle between the first frequency and the second frequency. In some implementations, cycling the operating frequency of the processor core is performed such that an average operating frequency of the processor core is based on the target frequency. Additionally, or alternatively, cycling the operating frequency of the processor core may include causing the operating frequency of the processor core to be the first frequency for a first time period and causing the operating frequency of the processor core to be the second frequency for a second time period, as further described with reference to FIG. 2. In such implementations, the first time period and the second time period are selected such that the average operating frequency is based on the target frequency, and a combined duration of the first time period and the second time period may correspond to a preconfigured image frame processing time, such as for an image processing pipeline of the device 102.

In some implementations, the method 500 also includes obtaining a second signal based on a second target frequency for a second processor core. For example, the frequency control circuit 108 obtains a signal (e.g., the signal 122 or the signals 126) that is based on a second target frequency for the second processor core 114. In such implementations, the method 500 further includes, based on the second signal, causing an operating frequency of the second processor core to cycle between a third frequency greater than the second target frequency and a fourth frequency less than the second target frequency. For example, the frequency control circuit 108 may generate the control signals 132 that cause the operating frequency of the second processor core 114 to cycle between the third frequency and the fourth frequency such that an average operating frequency of the second processor core 114 is based on a second target frequency.

In some implementations in which the method 500 includes causing the operating frequency of the second processor core to cycle between the third frequency and the fourth frequency, the method 500 also includes temporally aligning a first transition of the operating frequency of the processor core with a second transition of the operating frequency of the second processor core. For example, the signal 120 and the signal 122 may cause temporal alignment of a first transition of the operating frequency of the first processor core 112 with a second transition of the operating frequency of the second processor core 114. The first transition may be from the second frequency to the first frequency and the second transition may be from the fourth frequency to the third frequency, as described with reference to the first example 400 of FIG. 4, or the first transition is from the first frequency to the second frequency and the second transition is from the third frequency to the fourth frequency, as described with reference to the second example 420 of FIG. 4.

A technical advantage of operating frequency cycling performed by the method 500 is the ability to operate a processor core (e.g., the first processor core 112) at an average operating frequency that matches a target frequency that is between frequencies associated with supported DCVS levels. In this manner, the method 500 supports a finer granularity of operating frequencies for a processor core that more efficiently utilize processor and power resources than a group of supported DCVS levels.

It should be noted that while FIG. 5 shows example blocks of method 500, in some implementations, the method 500 may include additional blocks, fewer blocks, different blocks, or differently arranged blocks than those depicted in FIG. 5. The method 500 of FIG. 5 may be implemented by a field-programmable gate array (FPGA) device, an application-specific integrated circuit (ASIC), a processing unit such as a central processing unit (CPU), a digital signal processor (DSP), a controller, another hardware device, firmware device, circuitry, or any combination thereof.

Figure 6:
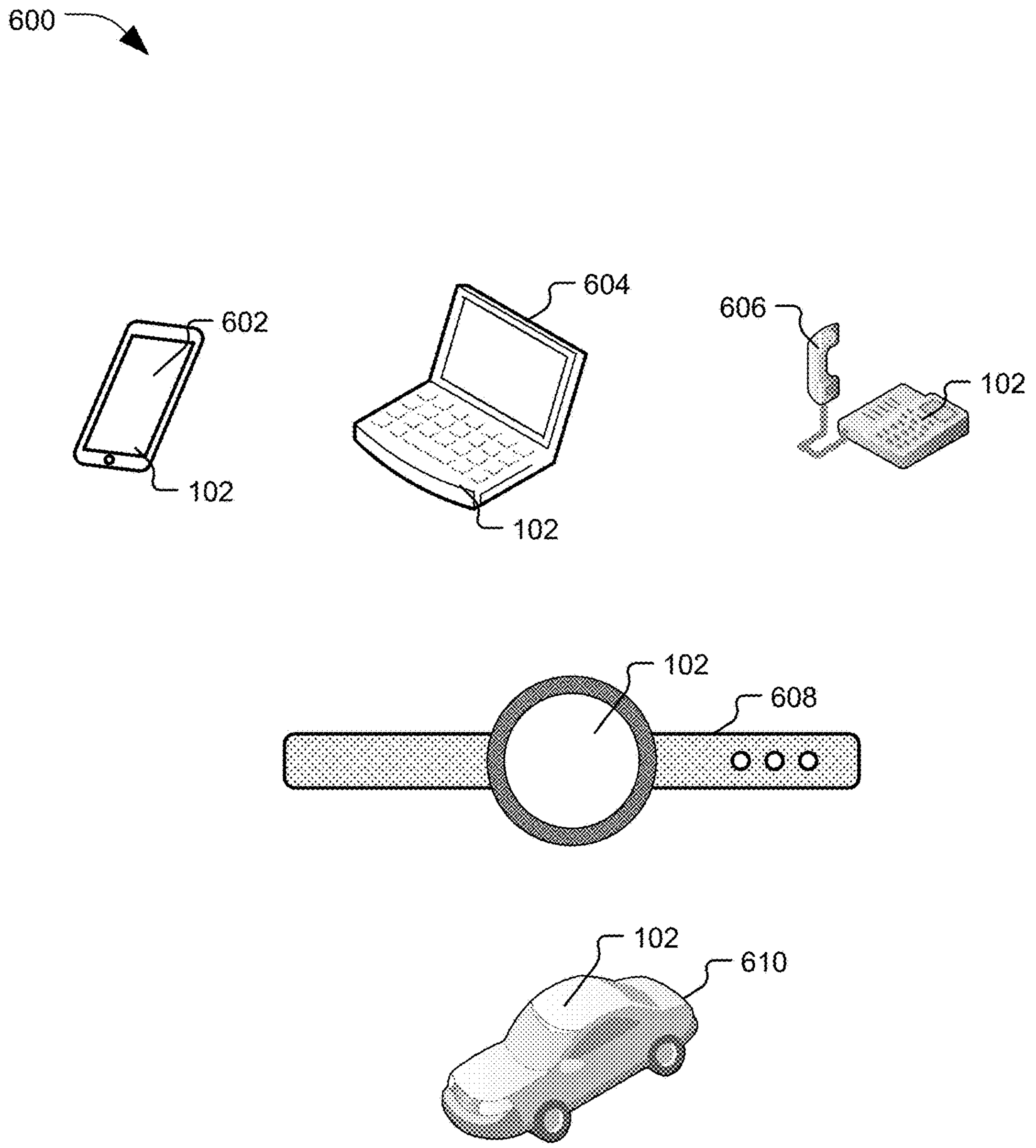
FIG. 6 illustrates various electronic devices that may integrate a frequency control circuit described herein.

FIG. 6 illustrates various electronic devices that may include or correspond to the device 102. For example, a mobile phone device 602, a laptop computer device 604, a fixed location terminal device 606, a wearable device 608, or a vehicle 610 (e.g., an automobile or an aerial device) may include the device 102. The devices 602, 604, 606 and 608 and the vehicle 610 illustrated in FIG. 6 are merely exemplary. Other electronic devices may also feature the device 102 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices (e.g., watches, glasses), Internet of things (IoT) devices, servers, routers, electronic devices implemented in vehicles (e.g., autonomous vehicles), or any other device that stores or retrieves data or computer instructions, or any combination thereof.

A technical advantage of electronic devices illustrated in FIG. 6 is the configuration of an electronic device to perform operating frequency cycling to operate a processor core at an average operating frequency that matches a target frequency that is between frequencies associated with supported DCVS levels. In this manner, the electronic devices shown in FIG. 6 support a finer granularity of operating frequencies for a processor core that more efficiently utilize processor and power resources than a group of supported DCVS levels, without significantly increasing the cost, complexity, and power consumption of such devices.

In conjunction with the described implementations, an apparatus includes means for obtaining a signal based on a target frequency for a processor core. For example, the means for obtaining the signal can correspond to the frequency control circuit 108, the device 102, the system 100 of FIG. 1, a processor, one or more other circuits or components configured to obtain a signal based on a target frequency for a processor core, or any combination thereof.

The apparatus also includes means for causing an operating frequency of the processor core to cycle between a first frequency greater than the target frequency and a second frequency less than the target frequency such that an average operating frequency of the processor core is based on the target frequency. For example, the means for causing the operating frequency of the processor core to cycle between the first frequency and the second frequency can correspond to the frequency control circuit 108, the device 102, the system 100 of FIG. 1, the signal alignment circuitries 300-304, the duty cycle timer circuitries 306-309, the voting aggregation circuitry 310 of FIG. 3, a processor, one or more other circuits or components configured to cause an operating frequency of a processor core to cycle between a first frequency and a second frequency such that an average operating frequency of the processor core is based on a target frequency, or any combination thereof.

One or more of the components, processes, features, and/or functions illustrated in FIGS. 1-6 may be rearranged and/or combined into a single component, process, feature or function or embodied in several components, processes, or functions. Additional elements, components, processes, and/or functions may also be added without departing from the disclosure. In some implementations, FIGS. 1-6 and its corresponding description may be used to manufacture, create, provide, and/or produce devices and/or integrated devices.

It is noted that the figures in the disclosure may represent actual representations and/or conceptual representations of various parts, components, objects, devices, packages, integrated devices, integrated circuits, and/or transistors. In some instances, the figures may not be to scale. In some instances, for purpose of clarity, not all components and/or parts may be shown. In some instances, the position, the location, the sizes, and/or the shapes of various parts and/or components in the figures may be exemplary. In some implementations, various components and/or parts in the figures may be optional.

Also, it is noted that various disclosures contained herein may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

Particular aspects of the disclosure are described below in sets of interrelated Examples:

According to Example 1, a device includes a processor core and a frequency control circuit, the frequency control circuit configured to: obtain a signal based on a target frequency for the processor core; and based on the signal, cause an operating frequency of the processor core to cycle between a first frequency greater than the target frequency and a second frequency less than the target frequency.

Example 2 includes the device of Example 1, wherein the frequency control circuit is configured to cycle the operating frequency of the processor core such that an average operating frequency of the processor core is based on the target frequency.

Example 3 includes the device of Example 2, wherein the frequency control circuit is configured to cause the operating frequency of the processor core to be the first frequency for a first time period, and wherein the frequency control circuit is configured to cause the operating frequency of the processor core to be the second frequency for a second time period, the first time period and the second time period selected such that the average operating frequency is based on the target frequency.

Example 4 includes the device of any of Examples 1 to 3, further including a second processor core, wherein the frequency control circuit is further configured to: obtain a second signal based on a second target frequency for the second processor core; and based on the second signal, cause an operating frequency of the second processor core to cycle between a third frequency greater than the second target frequency and a fourth frequency less than the second target frequency.

Example 5 includes the device of Example 4, further including: a shared power rail coupled to the processor core and the second processor core; and a voltage regulator configured to control a voltage of the shared power rail based on the operating frequency of the processor core and the operating frequency of the second processor core.

Example 6 includes the device of Example 5, wherein the frequency control circuit is further configured to temporally align a first transition of the operating frequency of the processor core with a second transition of the operating frequency of the second processor core, wherein the first transition is from the second frequency to the first frequency, and wherein the second transition is from the fourth frequency to the third frequency.

Example 7 includes the device of Example 6, wherein a third transition of the operating frequency of the processor core occurs at a different time than a fourth transition of the operating frequency of the second processor core, wherein the third transition is from the first frequency to the second frequency, and wherein the fourth transition is from the third frequency to the fourth frequency.

Example 8 includes the device of Example 5, wherein the frequency control circuit is further configured to temporally align a first transition of the operating frequency of the processor core with a second transition of the operating frequency of the second processor core, wherein the first transition is from the first frequency to the second frequency, and wherein the second transition is from the third frequency to the fourth frequency.

Example 9 includes the device of Example 8, wherein a third transition of the operating frequency of the processor core occurs at a different time than a fourth transition of the operating frequency of the second processor core, wherein the third transition is from the second frequency to the first frequency, and wherein the fourth transition is from the fourth frequency to the third frequency.

Example 10 includes the device of any of Examples 5 to 9, wherein the processor core and the second processor core are configured to implement an image processing pipeline of a video front end, and wherein the frequency control circuit is further configured to temporally align a first transition of the operating frequency of the processor core with a second transition of the operating frequency of the second processor core with a preconfigured image frame processing time.

Example 11 includes the device of any of Examples 1 to 10, wherein the signal indicates the target frequency, wherein the target frequency is a different frequency than a plurality of frequencies supported by the processor core, and wherein the frequency control circuit is further configured to select the first frequency and the second frequency from the plurality of frequencies based on the target frequency.

Example 12 includes the device of Example 11, wherein the frequency control circuit is configured to select a first time period corresponding to the first frequency and a second time period corresponding to the second frequency such that an average operating frequency of the processor core matches the target frequency.

Example 13 includes the device of any of Examples 1 to 10, wherein the signal indicates the first frequency, the second frequency, and a duty cycle between the first frequency and the second frequency.

Example 14 includes the device of any of Examples 1 to 13, wherein the frequency control circuit is configured to obtain the signal by receiving the signal from the processor core.

Example 15 includes the device of any of Examples 1 to 13, further including a plurality of processor cores that include the processor core, wherein the frequency control circuit is configured to obtain the signal by receiving the signal from a thread manager associated with the plurality of processor cores.

According to Example 16 a method includes: obtaining a signal based on a target frequency for a processor core; and, based on the signal, causing an operating frequency of the processor core to cycle between a first frequency greater than the target frequency and a second frequency less than the target frequency.

Example 17 includes the method of Example 16, further including: obtaining a second signal based on a second target frequency for a second processor core; and based on the second signal, causing an operating frequency of the second processor core to cycle between a third frequency greater than the second target frequency and a fourth frequency less than the second target frequency.

Example 18 includes the method of Example 17, further including: temporally aligning a first transition of the operating frequency of the processor core with a second transition of the operating frequency of the second processor core; and wherein: the first transition is from the second frequency to the first frequency and the second transition is from the fourth frequency to the third frequency; or the first transition is from the first frequency to the second frequency and the second transition is from the third frequency to the fourth frequency.

According to Example 19, an apparatus includes: means for obtaining a signal based on a target frequency for a processor core; and means for causing, based on the signal, an operating frequency of the processor core to cycle between a first frequency greater than the target frequency and a second frequency less than the target frequency.

Example 20 includes the apparatus of Example 19, wherein the signal indicates the first frequency, the second frequency, and a duty cycle between the first frequency and the second frequency.

According to Example 21, a non-transitory, computer-readable storage medium stores instructions that, when executed by at least one processor, cause the at least one processor to: obtain a signal based on a target frequency for a processor core; and cause an operating frequency of the processor core to cycle between a first frequency greater than the target frequency and a second frequency less than the target frequency such that an average operating frequency of the processor core is based on the target frequency.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:

a first processor core; a second processor core; and a frequency control circuit configured to:

obtain a first signal based on a first target frequency for the first processor core;

obtain a second signal based on a second target frequency for the second processor core;

based on the first signal, cause an operating frequency of the first processor core to cycle between a first frequency greater than the first target frequency and a second frequency less than the first target frequency;

based on the second signal, cause an operating frequency of the second processor core to cycle between a third frequency and a fourth frequency; and temporally align a first transition of the operating frequency of the first processor core and a second transition of the operating frequency of the second processor core to occur at a same time, wherein a third transition of the operating frequency of the first processor core occurs at a different time than a fourth transition of the operating frequency of the second processor core, and wherein the first transition and the second transition are in a first direction with respect to frequency that is opposite to a second direction of the third transition and the fourth transition.

2. The device of claim 1, wherein the frequency control circuit is configured to cycle the operating frequency of the first processor core such that an average operating frequency of the first processor core is based on the first target frequency.

3. The device of claim 2, wherein the frequency control circuit is configured to cause the operating frequency of the first processor core to be the first frequency for a first time period, and wherein the frequency control circuit is configured to cause the operating frequency of the first processor core to be the second frequency for a second time period, the first time period and the second time period selected such that the average operating frequency is based on the first target frequency.

4. The device of claim 1, wherein the third frequency is greater than the second target frequency and the fourth frequency is less than the second target frequency.

5. The device of claim 1, further comprising:

a shared power rail coupled to the first processor core and the second processor core; and a voltage regulator configured to control a voltage of the shared power rail based on the operating frequency of the first processor core and the operating frequency of the second processor core.

6. The device of claim 5, wherein the first transition is from the second frequency to the first frequency, and wherein the second transition is from the fourth frequency to the third frequency.

7. The device of claim 6, wherein the third transition is from the first frequency to the second frequency, and wherein the fourth transition is from the third frequency to the fourth frequency.

8. The device of claim 5, wherein the first transition is from the first frequency to the second frequency, and wherein the second transition is from the third frequency to the fourth frequency.

9. The device of claim 8, wherein the third transition is from the second frequency to the first frequency, and wherein the fourth transition is from the fourth frequency to the third frequency.

10. The device of claim 5, wherein the first processor core and the second processor core are configured to implement an image processing pipeline of a video front end, and wherein the frequency control circuit is further configured to temporally align the first transition of the operating frequency of the first processor core and the second transition of the operating frequency of the second processor core at the same time as a start of a preconfigured image frame processing time.

11. The device of claim 1, wherein the first signal indicates the first target frequency, wherein the first target frequency is a different frequency than a plurality of frequencies supported by the first processor core, and wherein the frequency control circuit is further configured to select the first frequency and the second frequency from the plurality of frequencies based on the first target frequency.

12. The device of claim 11, wherein the frequency control circuit is configured to select a first time period corresponding to the first frequency and a second time period corresponding to the second frequency such that an average operating frequency of the first processor core matches the first target frequency.

13. The device of claim 1, wherein the first signal indicates the first frequency, the second frequency, and a duty cycle between the first frequency and the second frequency.

14. The device of claim 1, wherein the frequency control circuit is configured to obtain the first signal by receiving the first signal from the first processor core.

15. The device of claim 1, further comprising a plurality of processor cores that include the first processor core, wherein the frequency control circuit is configured to obtain the first signal by receiving the first signal from a thread manager associated with the plurality of processor cores.

16. A method comprising:

obtaining a first signal based on a first target frequency for a first processor core;

obtaining a second signal based on a second target frequency for a second processor core;

based on the first signal, causing an operating frequency of the first processor core to cycle between a first frequency greater than the first target frequency and a second frequency less than the first target frequency;

based on the second signal, causing an operating frequency of the second processor core to cycle between a third frequency and a fourth frequency; and temporally aligning a first transition of the operating frequency of the first processor core with a second transition of the operating frequency of the second processor core to occur at a same time, wherein a third transition of the operating frequency of the first processor core occurs at a different time than a fourth transition of the operating frequency of the second processor core, and wherein the first transition and the second transition are in a first direction with respect to frequency that is opposite to a second direction of the third transition and the fourth transition.

17. The method of claim 16, wherein the third frequency is greater than the second target frequency and the fourth frequency is less than the second target frequency.

18. The method of claim 17, wherein:

the first transition is from the second frequency to the first frequency and the second transition is from the fourth frequency to the third frequency; or the first transition is from the first frequency to the second frequency and the second transition is from the third frequency to the fourth frequency.

19. An apparatus comprising:

means for obtaining a first signal based on a first target frequency for a first processor core;

means for obtaining a second signal based on a second target frequency for a second processor core;

means for causing, based on the first signal, an operating frequency of the first processor core to cycle between a first frequency greater than the first target frequency and a second frequency less than the first target frequency;

means for causing, based on the second signal, an operating frequency of the second processor core to cycle between a third frequency and a fourth frequency; and means for temporally aligning a first transition of the operating frequency of the first processor core with a second transition of the operating frequency of the second processor core to occur at a same time, wherein a third transition of the operating frequency of the first processor core occurs at a different time than a fourth transition of the operating frequency of the second processor core, and wherein the first transition and the second transition are in a first direction with respect to frequency that is opposite to a second direction of the third transition and the fourth transition.

20. The apparatus of claim 19, wherein the first signal indicates the first frequency, the second frequency, and a duty cycle between the first frequency and the second frequency.

* * * * *